(12) United States Patent
Fujimura et al.

(10) Patent No.: US 12,260,624 B2
(45) Date of Patent: Mar. 25, 2025

(54) INFORMATION PROCESSING METHOD FOR PRESENTING INFLUENCES OBTAINED FOR PREDICTION RESULTS, INFORMATION PROCESSING SYSTEM, AND RECORDING MEDIUM

(71) Applicant: Panasonic Intellectual Property Management Co., Ltd., Osaka (JP)

(72) Inventors: Ryota Fujimura, Kanagawa (JP); Yasunori Ishii, Osaka (JP); Takuya Yamaguchi, Osaka (JP); Hiroaki Urabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 371 days.

(21) Appl. No.: 17/826,990

(22) Filed: May 27, 2022

(65) Prior Publication Data
US 2022/0292816 A1    Sep. 15, 2022

Related U.S. Application Data

(63) Continuation of application No. PCT/JP2020/035522, filed on Sep. 18, 2020.

(30) Foreign Application Priority Data

Dec. 2, 2019 (JP) ................. 2019-218153

(51) Int. Cl.
*G06V 10/776* (2022.01)
*G06V 10/764* (2022.01)
(Continued)

(52) U.S. Cl.
CPC ......... *G06V 10/776* (2022.01); *G06V 10/764* (2022.01); *G06V 10/809* (2022.01); *G06V 10/945* (2022.01); *G06V 2201/07* (2022.01)

(58) Field of Classification Search
USPC ........................................................ 382/103
See application file for complete search history.

(56) References Cited

U.S. PATENT DOCUMENTS

| 11,763,561 B2 * | 9/2023 | Takahashi | G06V 20/41 382/103 |
| 2016/0132731 A1 * | 5/2016 | Hisada | H04N 7/181 382/103 |
| 2018/0268563 A1 | 9/2018 | Chen et al. | |

FOREIGN PATENT DOCUMENTS

JP    2018-181273    11/2018

OTHER PUBLICATIONS

International Search Report (ISR) issued on Dec. 1, 2020 in International (PCT) Application No. PCT/JP2020/035522.
(Continued)

*Primary Examiner* — Jacky X Zheng
(74) *Attorney, Agent, or Firm* — Wenderoth, Lind & Ponack, L.L.P.

(57) ABSTRACT

An information processing method performed by a computer includes: obtaining prediction results that are results of prediction performed by predictors on same input data; obtaining, for each of the prediction results, an influence that the input data had on the prediction result; determining, based on the prediction results, one or more combinations of the prediction results; and presenting, side by side or by superposition, using a presentation device, influences obtained for prediction results that are included in the prediction results and are in a same combination among the one or more combinations.

13 Claims, 13 Drawing Sheets

(51) Int. Cl.
*G06V 10/80* (2022.01)
*G06V 10/94* (2022.01)

(56) References Cited

OTHER PUBLICATIONS

Erik Bochinski, et al., "High-Speed Tracking-by-Detection Without Using Image Information", The 14th IEEE International Conference on Advanced Video and Signal based Surveillance (AVSS), Aug. 2017.

Denis Gudovskiy, et al., "Explain to Fix: A Framework to Interpret and Correct DNN Object Detector Predictions", 32nd Conference on Neural Information Processing Systems (NIPS 2018), Nov. 2018.

Extended European Search Report issued Apr. 5, 2023 in corresponding European Patent Application No. 20896142.5.

Ghosh, Soumil et al., "Comparative Analysis and Implementation of Different Human Detection Techniques", 2019 Fifth International Conference on Image Information Processing (ICIIP), IEEE, Nov. 15, 2019, pp. 443-447.

Office Action issued Jan. 8, 2025 in corresponding Chinese Patent Application No. 202080082714.5, with English translation of search report, 11 pages.

\* cited by examiner

{resultByModelA:
  [{x:8,y:8,w:10,h:30;class:"Pedestrian"},
   {x:45,y:34,w:27,h:20;class:"Car"},
   {x:34,y:28,w:15,h:20;class:"Pedestrian"},
   {x:5,y:5,w:24,h:16;class:"Car"},
   {x:56,y:23,w:12,h:30;class:"Pedestrian"}]
}

```
{resultByModelA:
  [{x:45,y:34,w:27,h:20;class:"Car"},
   {x:5,y:5,w:24,h:16;class:"Car"},
   {x:8,y:8,w:10,h:30;class:"Pedestrian"},
   {x:34,y:28,w:15,h:20;class:"Pedestrian"},
   {x:56,y:23,w:12,h:30;class:"Pedestrian"}]
}
```

FIG. 5B

{resultByModelA:
  [{x:45,y:34,w:27,h:20;class:"Car"},
   {x:5,y:5,w:24,h:16;class:"Car"},
   {blank},
   {blank},
   {x:8,y:8,w:10,h:30;class:"Pedestrian"},
   {x:34,y:28,w:15,h:20;class:"Pedestrian"},
   {x:56,y:23,w:12,h:30;class:"Pedestrian"}]
}

```
{resultByModelA:
  [{x:8,y:8,w:10,h:30;class:"Pedestrian";
    infl:0.1,0.1,0.2,0.1,...,-0.2,-0.2,-0.4,0.8}
   {x:45,y:34,w:27,h:20;class:"Car";
    infl:-0.1,-0.1,0.1,0.1,...,0.3,0.5,0.4,0.6}
   ...]
}
```

INFORMATION PROCESSING METHOD FOR PRESENTING INFLUENCES OBTAINED FOR PREDICTION RESULTS, INFORMATION PROCESSING SYSTEM, AND RECORDING MEDIUM

CROSS REFERENCE TO RELATED APPLICATIONS

This is a continuation application of PCT International Application No. PCT/JP2020/035522 filed on Sep. 18, 2020, designating the United States of America, which is based on and claims priority of Japanese Patent Application No. 2019-218153 filed on Dec. 2, 2019. The entire disclosures of the above-identified applications, including the specifications, drawings and claims are incorporated herein by reference in their entirety.

FIELD

The present disclosure relates to an information processing method and the like performed by a computer.

BACKGROUND

Techniques utilized to present detection results of objects appearing on an image are proposed (see, for example, PTL 1 and NPL 1).

CITATION LIST

Patent Literature

PTL 1: Japanese Unexamined Patent Application Publication No. 2018-181273

Non Patent Literature

NPL 1: Erik Bochinski et al, "High-Speed tracking-by-detection without using image information", 14th IEEE International Conference on Advanced Video and Signal Based Surveillance (AVSS), August 2017

SUMMARY

Technical Problem

According to the conventionally proposed techniques, it is difficult to concurrently evaluate respective behaviors of different predictors that respectively perform prediction processes such as an object detection process.

The present disclosure provides an information processing method and the like capable of concurrently evaluating respective behaviors of different predictors.

Solution to Problem

An information processing method according to an aspect of the present disclosure is a method performed by a computer and includes: obtaining prediction results that are results of prediction performed by predictors on same input data; obtaining, for each of the prediction results, an influence that the input data had on the prediction result; determining, based on the prediction results, one or more combinations of the prediction results; and presenting, side by side or by superposition, using a presentation device, influences obtained for prediction results that are included in the prediction results and are in a same combination among the one or more combinations.

Also, an information processing system according to an aspect of the present disclosure includes: a prediction result obtainer that obtains prediction results that are results of prediction performed by predictors on same input data; an input data influence obtainer that obtains, for each of the prediction results, an influence that the input data had on the prediction result; a determiner that determines, based on the prediction results, one or more combinations of the prediction results; and an influence presenter that presents, side by side or by superposition, using a presentation device, influences obtained for prediction results that are included in the prediction results and are in a same combination among the one or more combinations.

Note that these general or specific aspects may be implemented using, other than the method and system described above, a device, an integrated circuit, a computer-readable recording medium such as CD-ROM, or any combination of devices, systems, integrated circuits, methods, computer programs, and recording media.

Advantageous Effects

An information processing method and the like according to the present disclosure make it possible to concurrently evaluate respective behaviors of different predictors.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5B is a diagram illustrating an example of the data of the object detection result set corresponding to the result of the process illustrated in FIG. 5A.

Figure 1:
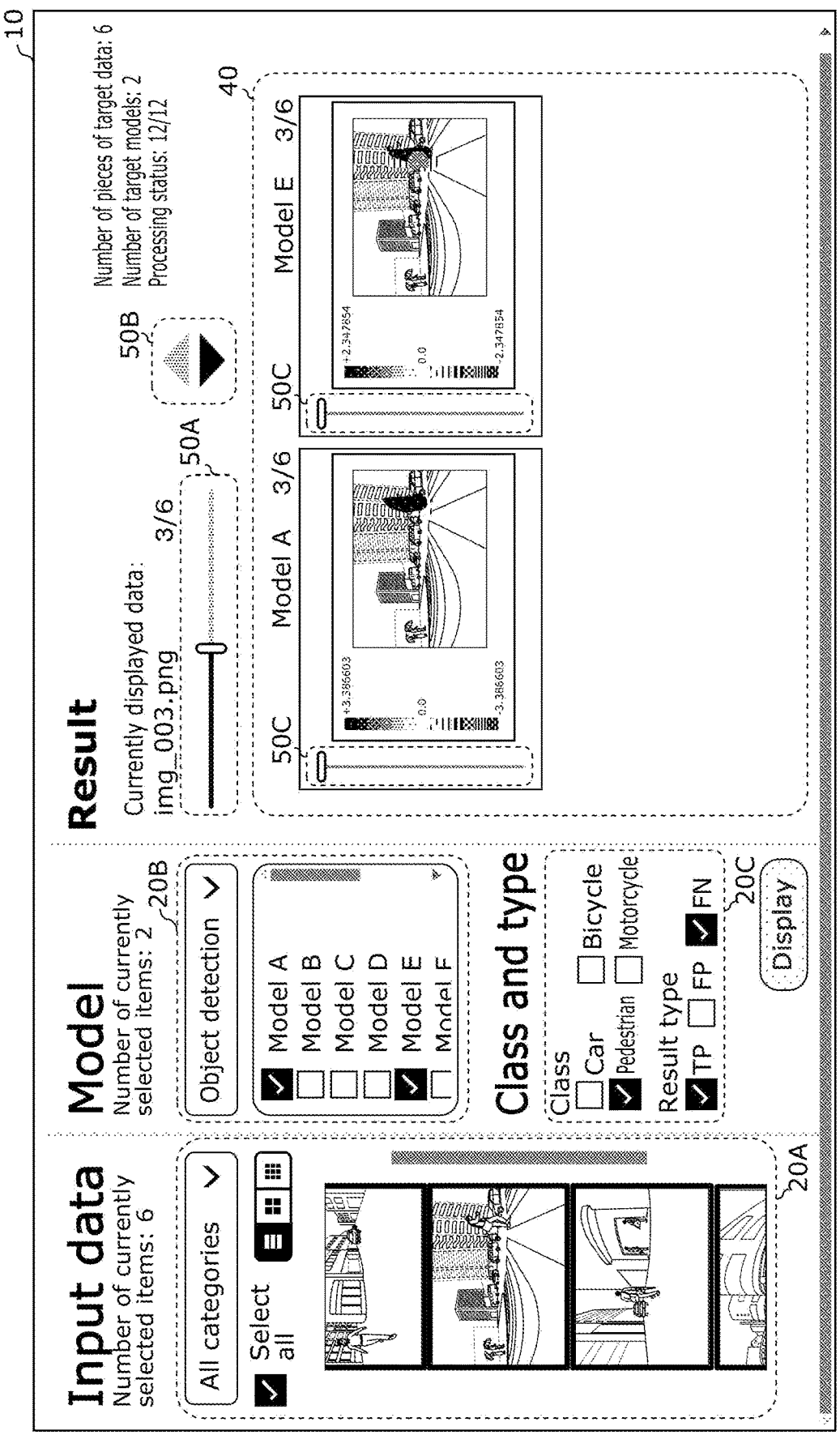
FIG. 1 is a schematic diagram of a screen to which an information processing method according to an embodiment can be applied.

DESCRIPTION OF EMBODIMENT (Underlying Knowledge Forming Basis of the Present Disclosure)

The present inventors found out that the above-mentioned conventionally proposed techniques had the following problems.

For example, the number of subjects that are detected (hereinafter, also referred to as detected subjects) may be different among object detections that are respectively executed on the same image by prediction models. In such a case, if a creator of the prediction models tries to compare and analyze detection results for each detected subject among the prediction models, it is troublesome only to find out results for the same detected subject from the detection results outputted by the prediction models, and this is inconvenient and inefficient. Moreover, even if the number of the detected subjects is the same, because an estimated position or an appearing range of a given detected subject may be different among the prediction models, association work by visual checking is troublesome and is likely to cause a mistake, and this is inefficient.

An information processing method according to an aspect of the present disclosure, which has been conceived in view of such inefficient situations, is a method performed by a computer and includes: obtaining prediction results that are results of prediction performed by predictors on same input data; obtaining, for each of the prediction results, an influence that the input data had on the prediction result; determining, based on the prediction results, one or more combinations of the prediction results; and presenting, side by side or by superposition, using a presentation device, influences obtained for prediction results that are included in the prediction results and are in a same combination among the one or more combinations.

According to this, for example, prediction results for a common target are selected and combined from among the respective prediction results by the prediction models (predictors). Then, the influences that the input data had on the prediction results included in this combination are presented at a time, side by side or by superposition. Consequently, the respective behaviors (that is, influences) of the different predictors can be concurrently evaluated. As a result, a user's trouble of analyzing the prediction results is reduced compared with the conventional case. Accordingly, the user can perform the analysis of the prediction results more efficiently compared with the conventional case.

Furthermore, each of the predictors may be an object detector, each of the prediction results may be an object detection result set that includes object detection results, the influence obtained for each of the prediction results may be an influence that the input data had on each of the object detection results included in the object detection result set, each of the one or more combinations may include object detection results included in different object detection result sets among the object detection result sets, and the influences presented side by side or by superposition may be influences obtained for the object detection results included in the same combination.

According to this, the influences that the input data had on the object detection results included in this combination are displayed at a time, side by side or by superposition. As a result, a user's trouble before reaching an analysis of the object detection results is reduced compared with the conventional case, and hence the user can perform the analysis of the object detection results more efficiently compared with the conventional case. This is particularly meaningful because objects are detected by each object detector during the object detection and the trouble of analyzing thus becomes enormous.

Furthermore, each of the object detection results may include a class that is based on an object detected, and in each combination among the one or more combinations, the class included in each of the object detection results included in the combination may be a class that is common to other object detection results included in the combination.

According to this, in the case where the object detection is executed for a plurality of classes, for example, even if estimated positions of detected subjects are close to each other, if the classes are different, presenting influences to the user at a time can be avoided. As a result, the user's trouble before reaching the analysis of the object detection results is reduced compared with the conventional case, and hence the user can perform the analysis of the object detection results more efficiently compared with the conventional case.

Here, for example, each of the object detection results may include a detection frame, and the one or more combinations may be determined based on overlap of or a positional relationship between detection frames included in the object detection results included in different object detection result sets. Furthermore, each of the object detection results may include a detection likelihood, and the one or more combinations may be determined further based on a degree of similarity between detection likelihoods included in the object detection results included in different object detection result sets.

According to this, a combination of detection results for a common detected subject can be established more reliably from among the respective object detection results by the object detectors.

Furthermore, the presenting of the influences may include presenting, side by side, substitution data and the influences obtained for the object detection results included in the same combination, when the same combination does not include the object detection results included in an object detection result set of an object detector among the object detectors. In addition, the information processing method according to an aspect of the present disclosure may further include presenting, side by side, substitution data and an influence obtained for an isolated object detection result when the object detection results include the isolated object detection result, the isolated object detection result being an object detection result not included in any of the one or more combinations.

According to this, in the case where the number of the detected subjects is different among the object detectors, the user can easily understand, for a given detected subject, which object detector did not detect the given detected subject or which object detector is the only object detector that detected the given detected subject.

Furthermore, the presenting of the influences may include presenting: an influence obtained for a reference object detection result that is one of the object detection results included in a reference object detection result set that is one of the object detection result sets; and influences obtained for the object detection results included in a combination among the one or more combinations that includes the reference object detection result. In addition, the information processing method according to an aspect of the present disclosure may further include: receiving an operation of selecting the reference object detection result set; and switching the reference object detection result set to the object detection result set selected by the operation.

According to this, the user can perform the analysis of the object detection results more efficiently compared with the conventional case, while focusing on a specific object detector. Moreover, the user can perform the analysis more efficiently compared with the conventional case, while changing the object detector to be focused on.

In addition, the information processing method according to an aspect of the present disclosure may further include: receiving an operation of selecting the input data; and switching the input data to the input data selected by the operation, wherein the presenting of the influences may include presenting influences obtained for the prediction results of prediction performed by the predictors on the input data selected.

According to this, even in the case where the number of pieces of the input data is more than one, the user can perform the analysis of the respective object detection results by the object detectors more efficiently compared with the conventional case.

In addition, the information processing method according to an aspect of the present disclosure may further include: receiving an operation of selecting a group of the object detection results; and switching the object detection results corresponding to the influences presented or the object detection results presented, to object detection results of the group selected by the operation.

According to this, the user can select the object detection results relating to presentation on a UI screen, depending on attributes, and thus can perform the analysis of the object detection results more efficiently compared with the conventional case.

Furthermore, the presenting of the influences may further include presenting, for each of the influences presented, information indicating a predictor among the predictors that has output the prediction result corresponding to the influence.

According to this, the user can discriminate to which predictor among the predictors the influences presented relate.

Furthermore, an information processing method according to an aspect of the present disclosure is a method performed by a computer, and may include: obtaining object detection result sets each including object detection results that are results of detection performed by object detectors on same input data; determining, based on the object detection results included in the object detection result sets, one or more combinations of the object detection results included in the object detection result sets, the one or more combinations each including one object detection result of each of the object detection result sets; and presenting, side by side or by superposition, using a presentation device, object detection results that are included in the object detection results in the object detection result sets and are in a same combination among the one or more combinations.

According to this, the respective behaviors (that is, object detection results) of the different object detectors can be concurrently evaluated. As a result, the user can perform the comparison among the respective object detection results by the object detectors more efficiently compared with the conventional case.

Furthermore, an information processing system according to an aspect of the present disclosure includes: a prediction result obtainer that obtains prediction results that are results of prediction performed by predictors on same input data; an input data influence obtainer that obtains, for each of the prediction results, an influence that the input data had on the prediction result; a determiner that determines, based on the prediction results, one or more combinations of the prediction results; and an influence presenter that presents, side by side or by superposition, using a presentation device, influences obtained for prediction results that are included in the prediction results and are in a same combination among the one or more combinations.

According to this, for example, prediction results for a common target are selected and combined from among the respective prediction results by the prediction models (predictors). Then, the influences that the input data had on the prediction results included in this combination are presented at a time, side by side or by superposition. Consequently, the respective behaviors of the different predictors can be concurrently evaluated. As a result, a user's trouble of analyzing the prediction results is reduced compared with the conventional case. Accordingly, the user can perform the analysis of the prediction results more efficiently compared with the conventional case.

Note that these general or specific aspects may be implemented using, other than the methods and system described above, a device, an integrated circuit, a computer-readable recording medium such as CD-ROM, or any combination of devices, systems, integrated circuits, methods, computer programs, and recording media.

Hereinafter, an embodiment of an information processing method and an information processing system according to an aspect of the present disclosure will be described with reference to the accompanying drawings. The embodiment described herein illustrates a specific example of the present disclosure. Therefore, the numerical values, shapes, constituent elements, the arrangement and connection of the constituent elements, steps (processes), the processing order of the steps, etc. illustrated in the embodiment below are mere examples, and do not intend to limit the present disclosure. In addition, among the constituent elements in the embodiment below, constituent elements not recited in any one of the independent claims are constituent elements which can be optionally added. Moreover, the drawings are schematic diagrams and are not necessarily precise illustrations.

EMBODIMENT

FIG. 1 is a schematic diagram of a screen to which an information processing method according to an embodiment can be applied. This screen functions as a user interface (hereinafter, represented as a UI) of application software used to analyze results of prediction by predictors. This application software may be a web application that displays this screen (hereinafter, referred to as a UI screen) on a web browser, and may be a native application or a hybrid application. This application software is executed by, for example, a processor included in a computer for business or personal purposes of various types such as a tower type, a desktop type, or a tablet type, and displays the UI screen on a monitor used by the user.

UI screen 10 receives a user's operation and displays the results of prediction by the predictors or information pertaining to the results in accordance with this user's operation. Note that the present embodiment is described by taking, as an example, the case where the predictors are object detectors that detect objects appearing on input images indicated by input data. The information pertaining to the results of prediction in this example is, for example: information concerning the existence or non-existence of an influence that each portion of the input data had on each of the results of prediction by the object detectors; and information concerning any or both of the size and the direction (whether the influence is positive or negative) of the influence if there is any influence. In other words, the influence is, for example, a response that is made by each predictor on the input data in a prediction process for outputting each prediction result. Alternatively, the influence may be expressed as an analysis result (that is, an analysis frame or analysis value) of the response.

UI screen 10 is divided into three portions of an input data field, a model field, and a result field in the stated order from the left. The input data field includes input data selector 20A. The model field includes model selector 20B and display result selector 20C. The result field includes result display 40, display data switcher 50A, analysis frame collective switcher 50B, and analysis frame individual switcher 50C.

Input data selector 20A presents candidates of the input data to be displayed in the result field with the prediction results or the analysis results (which are hereinafter also referred to as result information without being discriminated from each other) being superposed on the input data, and allows the user to select any of the candidates. The input data in this example is data of images, and the input data is presented as thumbnails of the images. Thumbnails of images selected by the user (all the images in the example illustrated in FIG. 1) are each surrounded by a thick frame. Hereinafter, the input data is also referred to as an input image.

Model selector 20B presents candidates of the predictors whose result information is to be displayed, and allows the user to select any of the candidates. The predictors here mean prediction models (hereinafter, also referred to simply as models, for the sake of convenience) of machine learning. In the example illustrated in FIG. 1, the user narrows the candidates of the prediction models down to candidates for the purpose of object detection, and then selects two models of "Model A" and "Model E". Note that, even if the models selected by model selector 20B in this way are common in the purpose, the selected models are different in: the category depending on a difference in a training method or a network configuration; a data set used for training; or the amount of training.

Display result selector 20C allows the user to select items of the result information to be displayed. In the case of the object detection, what the user is allowed to select as the items of the result information is, for example, the category (class) of a detected object. In the example illustrated in FIG. 1, a car, a bicycle, a pedestrian, and a motorcycle are presented as selectable classes, and the pedestrian is selected. Moreover, in the example illustrated in FIG. 1, what the user is allowed to also select as another item of the result information to be displayed is a result type (TP: True Positive, FP: False Positive, and FN: False Negative). In the example illustrated in FIG. 1, TP and FN are selected.

After such selections in input data selector 20A, model selector 20B, and display result selector 20C, if the user clicks or taps a display button placed below display result selector 20C, the result information is displayed in result display 40 in the result field, depending on the contents of the selections. In the example illustrated in FIG. 1, one of the input images selected in input data selector 20A and information concerning an object detection result corresponding to the prediction result for this input image are displayed in result display 40 together with the name of each of the models for object detection that outputs the object detection result.

In the example illustrated in FIG. 1, two display images are displayed in result display 40 while being arranged in the left-right direction, and influences on the prediction results for one of the input images selected in input data selector 20A, by the two models (Model A and Model E) selected in model selector 20B are respectively superposed on the two display images. Note that the display images may be displayed while being arranged in the top-bottom direction.

Which of the input images selected in input data selector 20A is to be displayed in result display 40 can be switched by using display data switcher 50A. In the example illustrated in FIG. 1, display data switcher 50A is a slider, and the input image displayed in result display 40 is switched depending on the position of a knob moved by the user. Along with the switching of the input images, the result information superposed on the input image is also switched. Moreover, in this example, the name of the input image currently displayed in result display 40 and the order thereof among the selected input images are displayed above display data switcher 50A.

Analysis frame collective switcher 50B and analysis frame individual switcher 50C allow the user to perform switching of analysis frames corresponding to an aspect of the influences on the prediction results, the analysis frames being respectively superposed on the input images and displayed as part of the display images in result display 40. The switched analysis frame is superposed on each input image, whereby a display image is generated. For example, if each model executes object detection on one input image and multiple objects are detected, one analysis frame is generated for each of the detection results (that is, detection frames). Note that what is superposed at a time on each input image in result display 40 is one of the analysis frames generated for the detection frames. In the example illustrated in FIG. 1, if the user once clicks or taps (hereinafter, also expressed as "presses" without discriminating between a click operation and a tap operation) any of an upward triangle and a downward triangle that are components of analysis frame collective switcher 50B provided only one to the result field, the analysis frames respectively superposed on the input images displayed in result display 40, among the analysis frames generated for the respective detection results by the models, are collectively switched one after another. Moreover, analysis frame individual switcher 50C that is the slider is provided for each input image (that is, each display image) on which the analysis frame concerning each model is superposed, in result display 40. If the user moves the knob of the slider, the analysis frame superposed on the input image can be individually switched for each image.

With the application of the information processing method according to the present embodiment to this UI screen 10, an analysis of prediction results can be more efficiently performed using UI screen 10. In another way of saying, the user can more efficiently perform the analysis of the prediction results using the UI screen that is operable in a manner similar to the conventional case.

Figure 2:
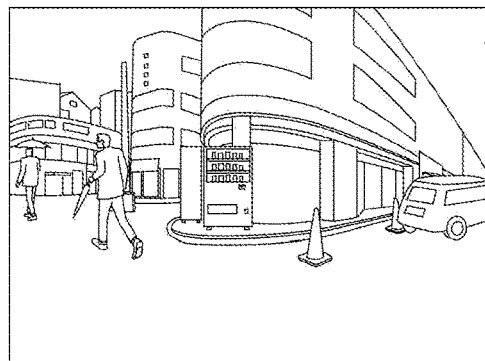
FIG. 2 is a schematic diagram for describing a difference in object detection results between different object detection models.
Figure 2:
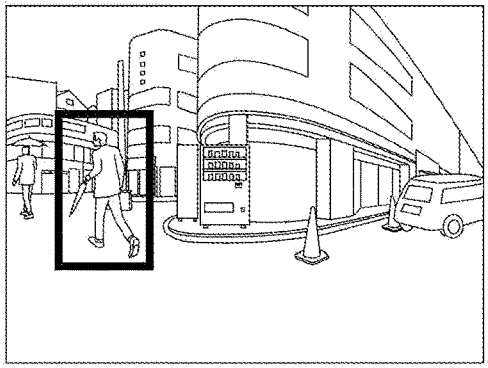
Figure 2:
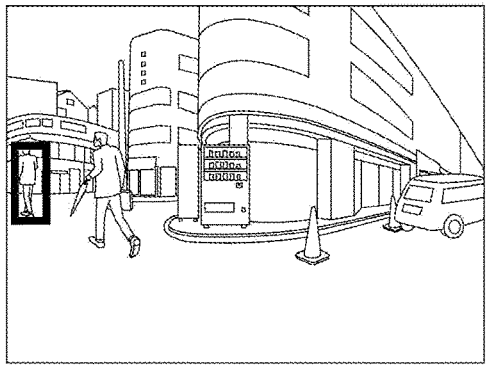
Figure 2:
Figure 2:
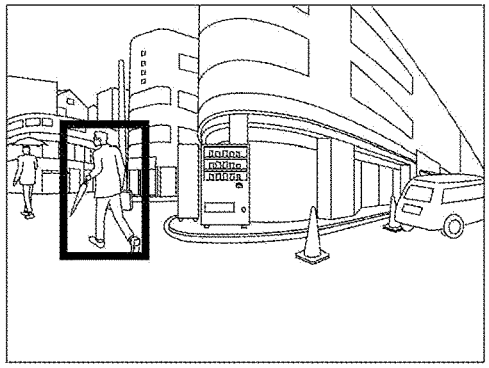
Figure 2:
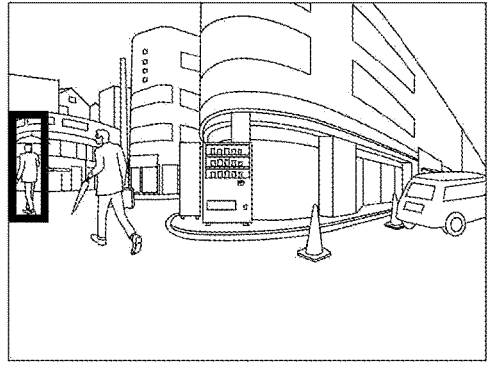
Figure 2:
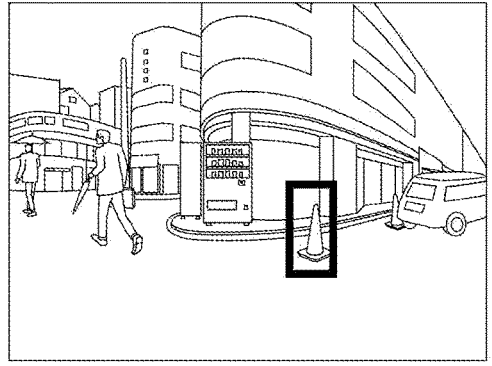

There is often such a difference as described above among the prediction results for the same input data, by the models. For example, in object detection, the number, estimated positions in each image, or appearing ranges of subjects that are detected (hereinafter, also referred to as detected subjects) can be different among the models. FIG. 2 is a schematic diagram for describing such a difference in object detection results between the models. In FIG. 2, illustrated are detection frames each surrounding a pedestrian or a car that is a detected subject, among respective object detection results for input image Image 1 by the two models of Model A and Model B. Comparing the object detection results by the two models, the number of the detected pedestrians is different, and the sizes and ranges of detection frames that seem to be a detection frame of a common pedestrian are similar but are not coincident. Note that the third detection frame from the top by Model B surrounds a traffic cone on a road that is erroneously detected as a pedestrian or a car, and the third detection frame is an example of result type FP. Then, a car appearing in the right end of each image is detected by Model A but is not detected by Model B. Moreover, these detection frames are arranged from the top in order in which these detection frames are included in data of the detection results outputted by each model, and the arrangement order may be different between the models as illustrated in FIG. 2.

The user uses UI screen 10 to compare and analyze, for each detected subject, the object detection results outputted by the models. At this time, a request to arrange and display results for a common detected subject at a time on UI screen 10 can be made. Conventionally, in such a case, the user uses analysis frame individual switcher 50C to find out detection results that can be regarded as detection results for the common detected subject (for example, a pedestrian appearing near the left end of each image), from the object detection results outputted by each model, and the user causes the found detection results to be displayed in result display 40. Alternatively, the user rearranges and adjusts the object detection results outputted by each model in his/her desired order, and then uses analysis frame collective switcher 50B, although an operator therefor is not illustrated on UI screen 10.

The information processing method according to the present embodiment serves to save a user's trouble in this rearrangement in a sense. Hereinafter, the rearrangement according to this method is described in detail using examples.

Figures 3A, 3B:
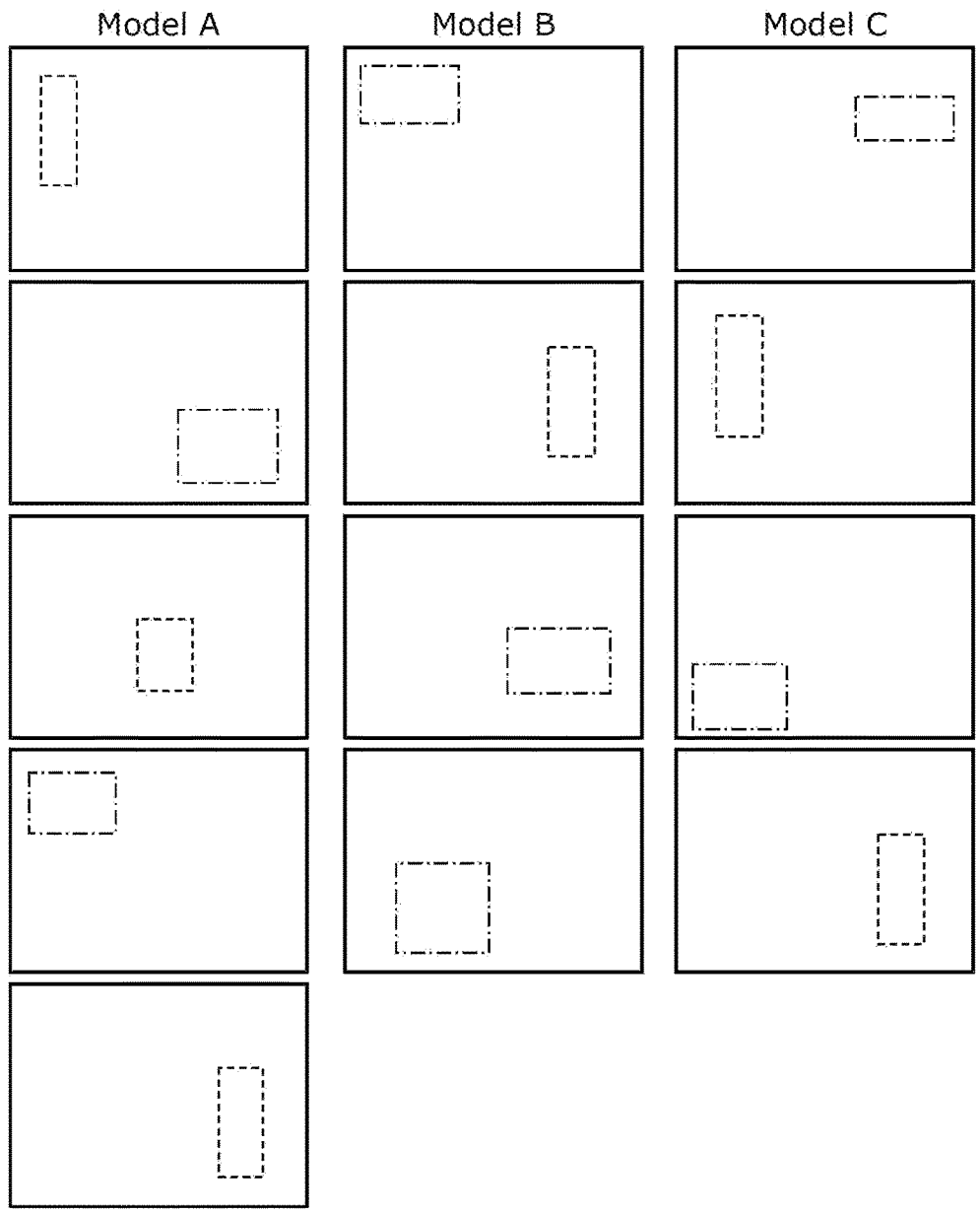
FIG. 3A is a diagram schematically illustrating object detection results for a common input image by three object detection models.
FIG. 3B is a diagram illustrating an example of data of an object detection result set outputted by one of the object detection models.

FIG. 3A is a diagram schematically illustrating object detection results for a common input image by three object detection models. Solid line rectangles each represent the entire region of the input image that is a target of an object detection process. Moreover, a broken line frame or an alternate long and short dash line frame in each solid line rectangle is a detection frame obtained as a result of the object detection process by each model, and different types of lines represent detection frames of detected subjects in different classes, for example, a pedestrian and a car. The arrangement in the top-bottom direction of these detection frames corresponds to the order in which pieces of data concerning the detection frames are arranged in the data of the object detection results outputted by each object detection model. FIG. 3B illustrates an example of the data of the object detection results outputted by Model A that is one of the models. Each row of from the second row to the sixth row of this data includes an output value concerning each detection frame. The content of this output value shows the position and size (range) in the entire image region and the class of the detected subject, of each of the detection frames included in the object detection results by Model A in FIG. 3A. Similar data is also outputted by Models B and C that are other object detection models. Note that, hereinafter, the object detection results outputted by each of the object detection models are also referred to collectively as an object detection result set. That is, the data illustrated in FIG. 3B is the data of the object detection result set formed from five detection frames obtained as a result of executing object detection on one input image by Model A. Note that the illustration in FIG. 3B is an example of the structure and numerical values of such data, and the form and numerical values of the data of the object detection result set are not limited to this example. Moreover, items included in each object detection result are not limited to this example. For example, the above-mentioned result type may be included in the object detection result. The same applies to FIG. 4B, FIG. 5B, and FIG. 9B to be used in the following description.

If this input image is selected as a display target in input data selector 20A on UI screen 10, the object detection results (detection frames) included in the display image are switched in result display 40 in the arrangement order thereof in the top-bottom direction of the figure, through operations using analysis frame collective switcher 50B and analysis frame individual switcher 50C.

Figures 4A, 4B:
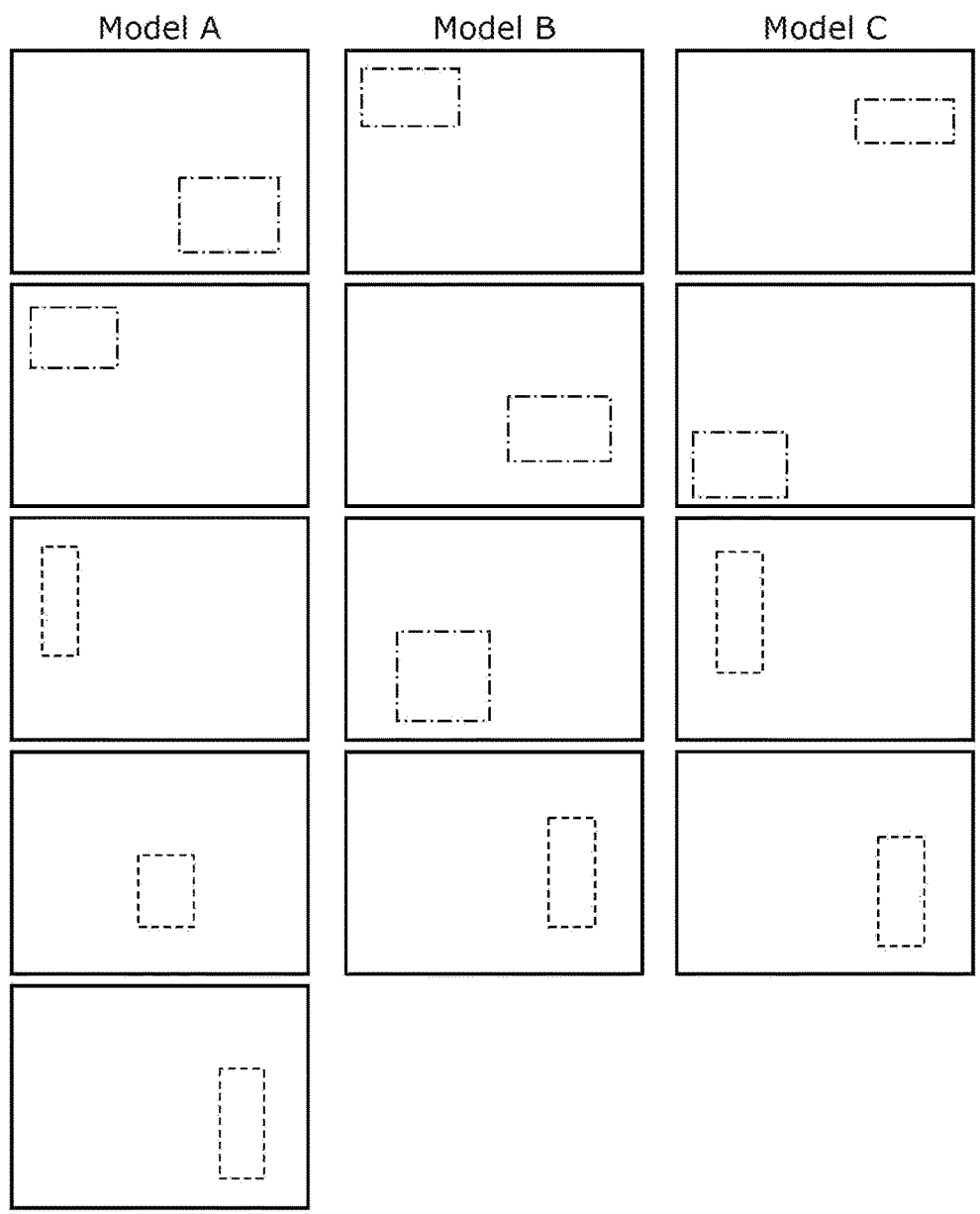
FIG. 4A is a diagram schematically illustrating an example of the state after the information processing method according to the embodiment is applied to the object detection results illustrated in FIG. 3A.
FIG. 4B illustrates an example of the data of the object detection result set after the information processing method according to the embodiment is applied.

FIG. 4A is a diagram schematically illustrating an example of the state after the information processing method according to the present embodiment is applied to the object detection results illustrated in FIG. 3A. In the example illustrated in FIG. 4A, the detection frames corresponding to the object detection results by each object detection model are sorted depending on the classes of the detected subjects. This reflects that, according to this information processing method, the output values of each of the detection frames are rearranged depending on the classes ("car" and "pedestrian") of the detected subjects, in the data of the object detection result set outputted by each object detection model. For example, as illustrated in FIG. 4B, the output values of the detection frames in from the second row to the sixth row are rearranged in the order of the classes ("car" and "pedestrian") of the detected subjects, in the data of the object detection result set outputted by Model A illustrated in FIG. 3B. Similar rearrangement is performed also in the data of the object detection result sets outputted by Models B and C.

Figure 5A:
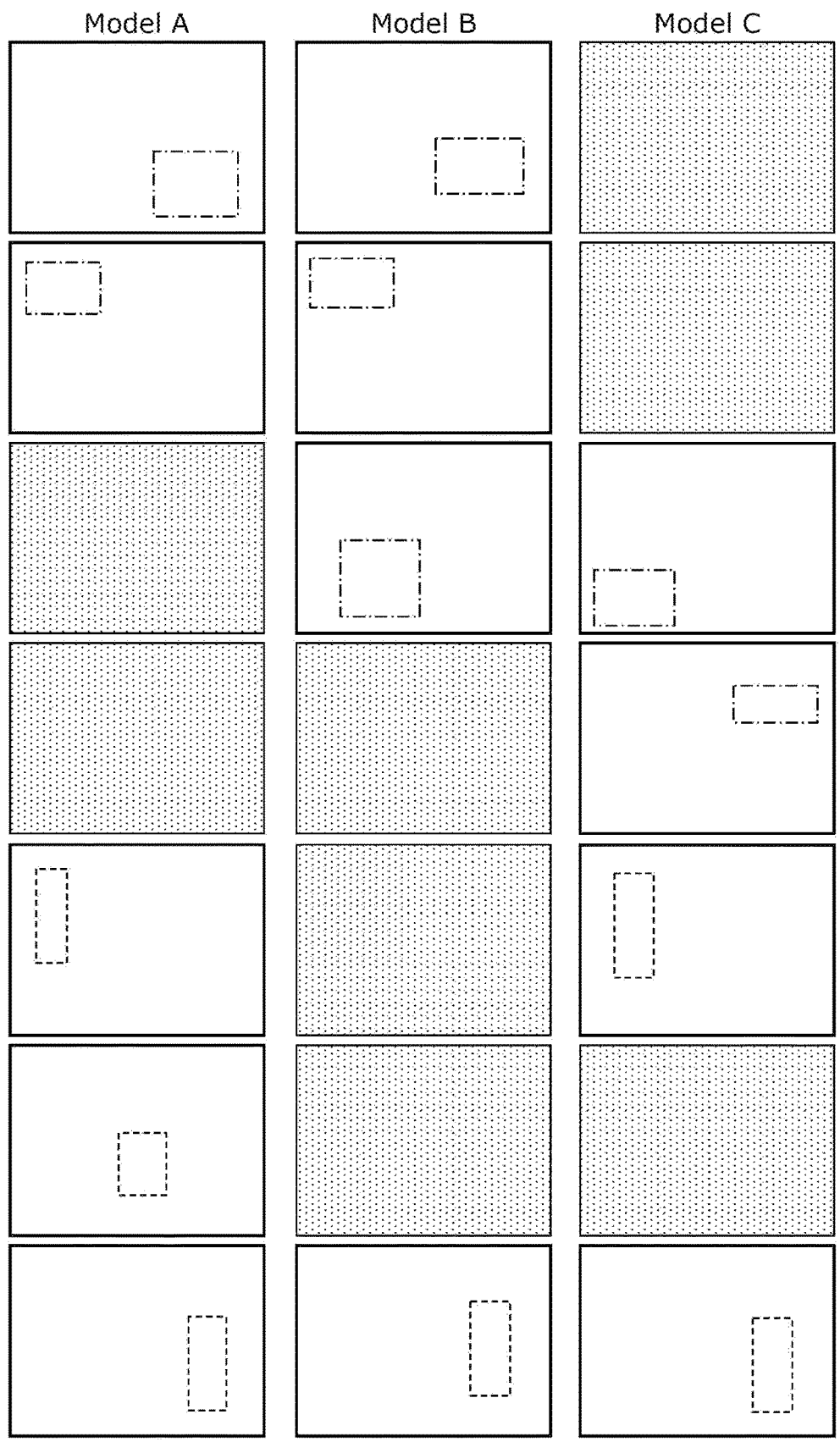
FIG. 5A is a diagram for describing a result of a process of inserting substitution data in the information processing method according to the embodiment.

FIG. 5A is a diagram for describing a result of a process that is performed subsequently to the above-mentioned sorting performed depending on the classes of the detected subjects, in the information processing method according to the present embodiment. The result illustrated in FIG. 5A is described while focusing on different points from the state illustrated in FIG. 4A.

With reference to FIG. 5A, detection results for a common detected subject (or detection results that are highly likely to be the detection results for the common detected subject), among the object detection result sets respectively outputted by the object detection models of Models A, B, and C, are placed at the same position (order) in the top-bottom direction.

In order to arrange the object detection results in such a manner as described above, the arrangement order of the object detection results in the object detection result set outputted by any of the models is defined as a reference, and the object detection results in the object detection result sets respectively outputted by the other models are rearranged based on the defined reference. At this time, based on overlap of detection frames in the same class among the detection frames included in the object detection result sets respectively outputted by two models, the arrangement order of the object detection results in the detection result set outputted by the model that is not defined as the reference of the arrangement order may be determined. The overlap of the detection frames means, for example, Intersection over Union (IoU), that is, the ratio of the intersection to the union of the detection frames. Alternatively, more simply, based on the size of an overlapping portion of detection frames in the same class, whether or not to place the object detection results in the same order may be determined.

Moreover, as another example of the method of determining the arrangement order of the object detection results in the object detection result set, the arrangement order thereof may be determined based on a positional relationship between detection frames in the same class among the object detection result sets respectively outputted by the object detection models. As a specific example based on the positional relationship between the detection frames, the distance between corresponding vertexes or corresponding sides of two detection frames or the distance between geometric centers of the two detection frames may be used.

Note that placing the detection results in the same order for each detected subject in the object detection result sets respectively outputted by the object detection models as described above is also referred to as determining a combination of the object detection results (or prediction results), in the present disclosure. In another way of saying, two or three object detection results included in the same row in FIG. 5A are included in the same combination. The object detection results included in the same combination are displayed at a time in result display 40 without a user's trouble of finding and rearranging. In the example illustrated in FIG. 5A, the detection frames that are placed in the same row and correspond to the object detection results by the respective models are detection frames in the same class, and these detection frames are larger in the IoU or closer in the position in each image than the detection frames placed in other rows.

Whether or not the detection results by the different models are to be included in the same combination based on the overlap of the detection frames such as the IoU or based on the positional relationship between the detection frames may be determined by, for example, comparing the overlap or the distance with a predetermined threshold value. Even if given detection results are detection frames in the same class and are larger in the IoU than the detection frames placed in other rows, in the case where the IoU falls below the predetermined threshold value, it is determined that the given detection results are not to be included in the same combination. As another example, it may be determined by achieving overall optimization according to the Hungarian algorithm or the like.

Note that a method of selecting the object detection result set (hereinafter, also referred to as a reference object detection result set) that is used as the reference of the rearrangement of the object detection results in each object detection result set, by a computer that performs the information processing method according to the present embodiment is not particularly limited. For example, the user may be allowed to select the reference object detection result set. Alternatively, for example, an object detection result set in which the number of the detection results (detection frames) is the smallest or an object detection result set in which the number thereof is the largest may be selected as the reference object detection result set. Alternatively, for example, it may be randomly selected at the time of the rearrangement. FIG. 5A illustrates the result obtained by using, as the reference, the order of the object detection results in the object detection result set by Model A in such a process performed in the information processing method according to the present embodiment.

Moreover, the result illustrated in FIG. 5A includes dotted rectangles that are not in FIG. 4A. In the case where there is a detected subject that has been detected by only part of the models selected in model selector 20B, these rectangles correspond to data (hereinafter, referred to as substitution data) indicating substitutive information that is inserted in the object detection result sets by the models that have not detected this detected subject. FIG. 5B is a diagram illustrating an example of inserting the substitutive information in the object detection result set outputted by Model A. The "{blank}" in each of the fourth row and the fifth row in FIG. 5B is an example of the inserted substitutive information. This information corresponds to the two dotted rectangles existing in the column of the object detection results by Model A in FIG. 5A. The substitution data is presented side by side with the display images based on the object detection results by the other models in result display 40, whereby information that this detected subject has not been detected by this model is presented to the user. Such substitution data may be presented as, for example, a blank frame or a simple frameless blank region, and may be presented as, for example, characters, symbols, patterns, or figures indicating the non-detection, in result display 40.

Figure 6:
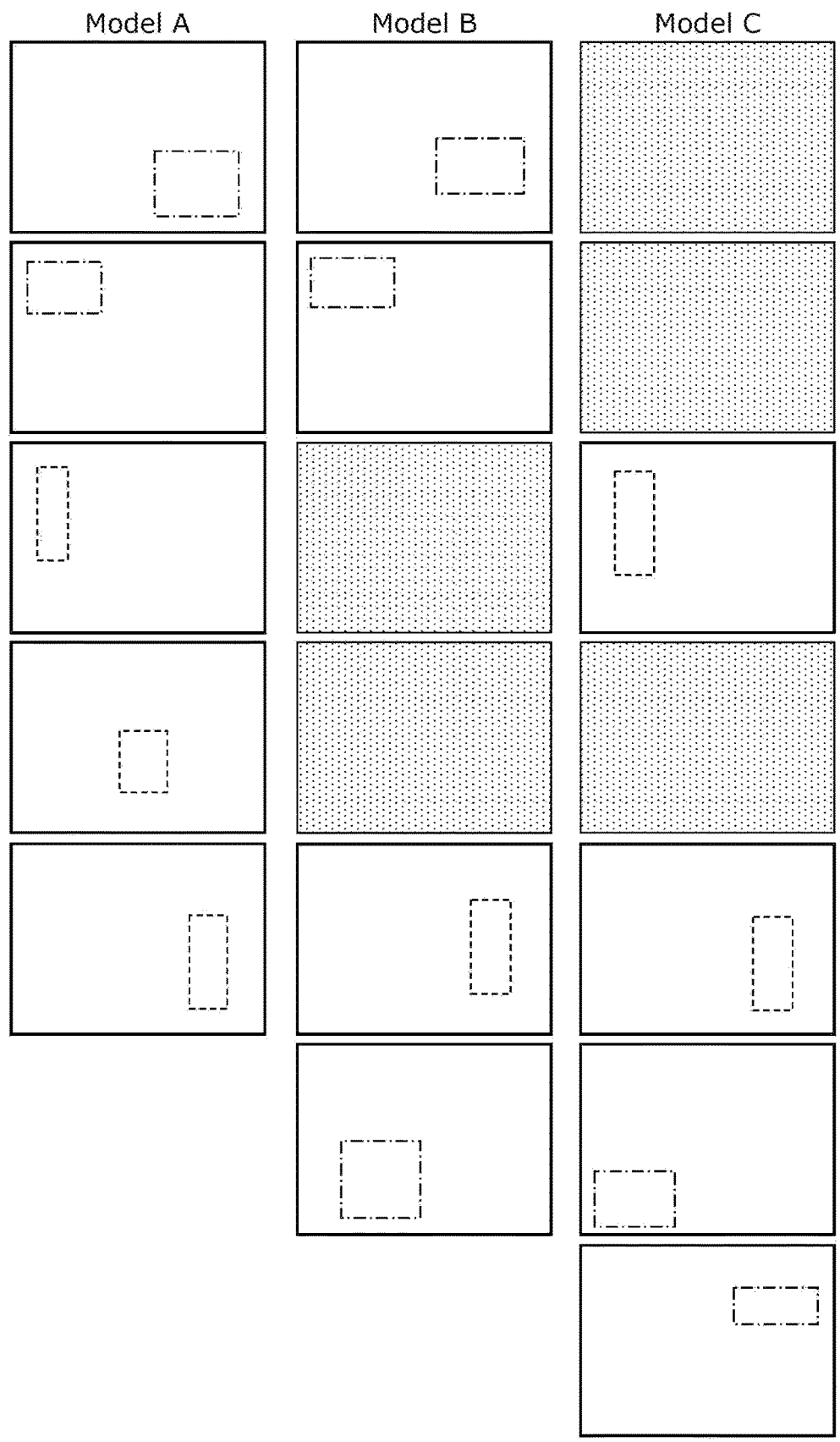
FIG. 6 is a diagram for describing an aspect of the process of inserting the substitution data in the information processing method according to the embodiment, which is different from the example illustrated in FIG. 5A.

Moreover, FIG. 6 is a diagram for describing an aspect of inserting the substitution data, which is different from the example of FIG. 5A. Also in this example, what is used as the reference of the arrangement order of the object detection results is the arrangement order of the object detection results in the object detection result set by Model A. However, in FIG. 6, the substitution data is not inserted in the object detection result set by Model A, and the state illustrated in FIG. 4A after the sorting based on the classes is maintained. The detection results for the detected subjects that have not been detected by Model A, among the object detection results included in the object detection result sets by Model B and Model C are gathered at the end (lowermost portion) of the arrangement order.

Such rearrangement (sorting) of the object detection results in the object detection result set may be automatically executed by, for example, pressing a display button by the user. Alternatively, UI screen 10 may be provided with an operation component (not illustrated) for receiving an instruction to execute such rearrangement from the user, and the rearrangement may be executed in response to an operation on this operation component.

Note that the fourth one and the sixth one from the top by Model A in FIG. 5A and the fourth one from the top by Model A in FIG. 6 correspond to the detection results (hereinafter, referred to as isolated object detection results) for the detected subjects that have been detected by only any one of the three models. The isolated object detection results are not included in any of the combinations of the object detection results determined as described above. Display images based on such isolated object detection results may also be presented side by side with the substitution data in result display 40.

A display example on UI screen 10 after such rearrangement is performed is illustrated in FIG. 7A to FIG. 7D. Part of result display 40 and analysis frame collective switcher 50B in the result field of UI screen 10 are extracted and illustrated in FIG. 7A to FIG. 7D. For the target image of the object detection, see image Image 1 in FIG. 2. In this example, the case where the three models of Model A, Model B, and Model C execute the object detection on image Image 1 is assumed.

Figure 7A:
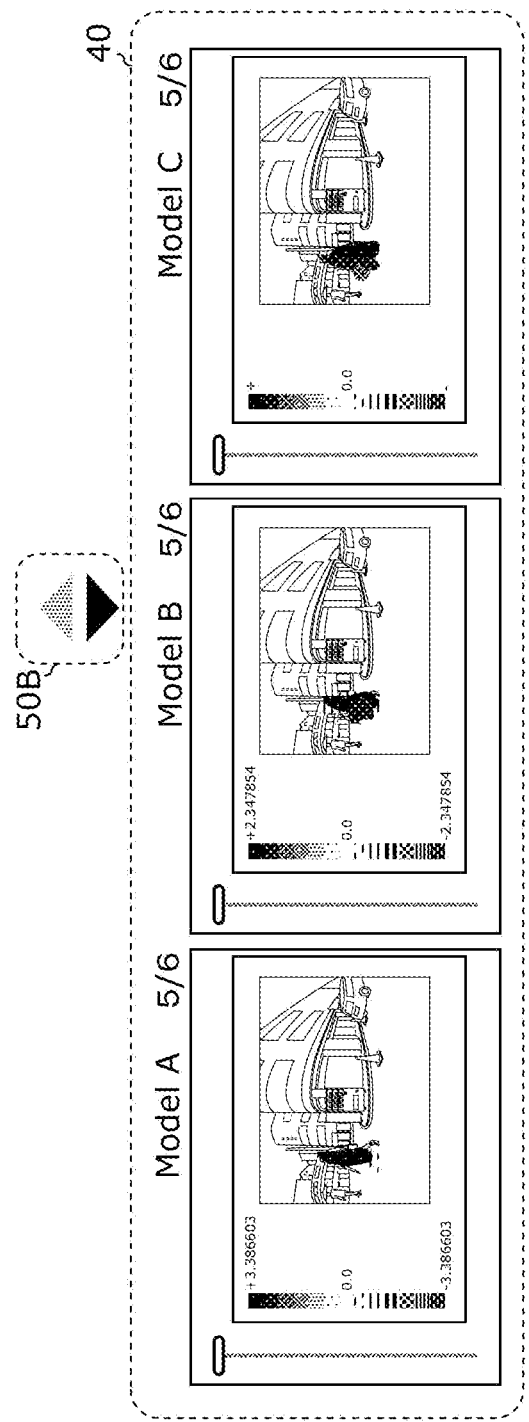
FIG. 7A illustrates a display example on a UI screen to which the information processing method according to the embodiment is applied.

With reference to FIG. 7A, in this state, presented side by side are display images each including an analysis result for a detection result of a pedestrian that has been detected by all of the three models and appears a little closer to the left end from the center. In the example of the present disclosure, the analysis result (the size and the direction of an influence) that is called the analysis frame in the above is schematically represented by a patterned region superposed on each image. A portion on which no analysis frame is superposed corresponds to the fact that this portion of the input image has no influence on the object detection result or has an extremely small influence thereon.

Figure 7B:
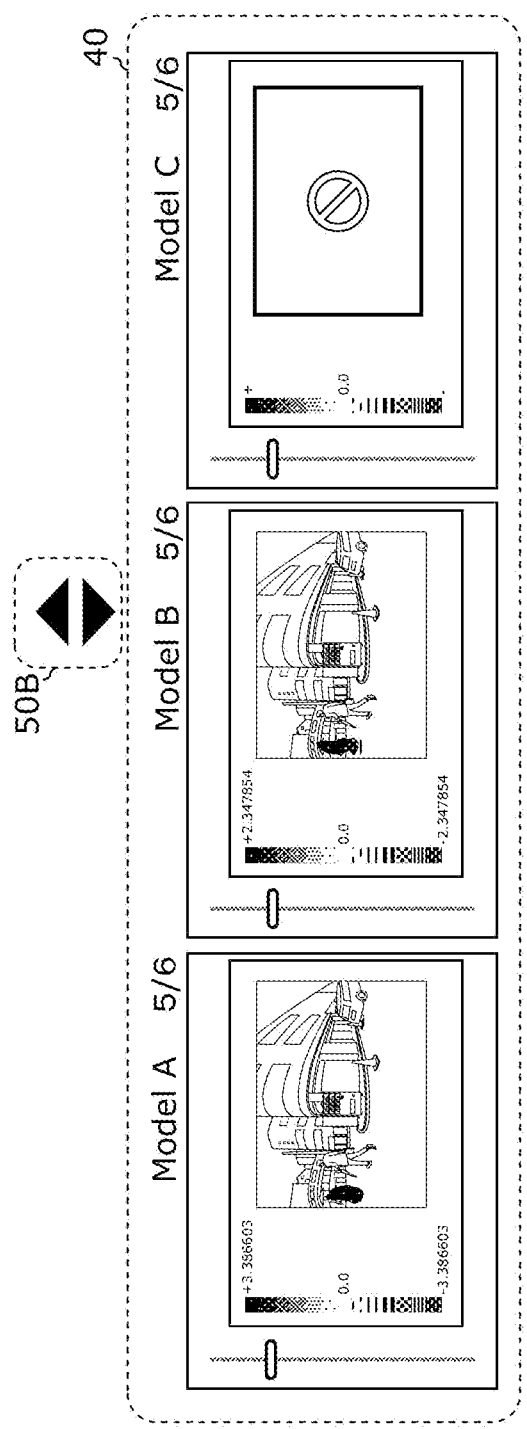
FIG. 7B illustrates a display example on a UI screen to which the information processing method according to the embodiment is applied.

FIG. 7B illustrates the state of result display 40 after the downward triangle included in analysis frame collective switcher 50B is pressed once in the state illustrated in FIG. 7A. Presented are display images each including an analysis result for a detection result of a pedestrian that is included in both of the object detection result sets respectively outputted by Model A and Model B and appears close to the left end of the input image. Moreover, for Model C, this pedestrian has not been detected, and hence a frame including a figure as substitution data is displayed side by side with the other display images.

Figure 7C:
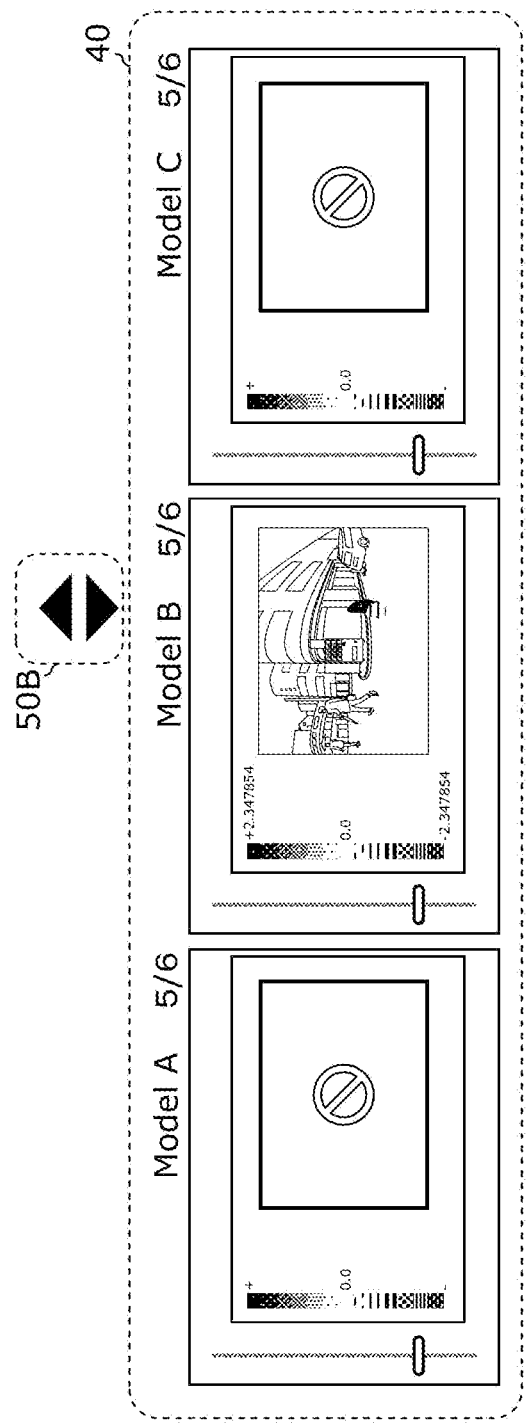
FIG. 7C illustrates a display example on a UI screen to which the information processing method according to the embodiment is applied.

FIG. 7C illustrates the state of result display 40 after the downward triangle included in analysis frame collective switcher 50B is pressed further once in the state illustrated in FIG. 7B. In this state, presented side by side are: a display image including an analysis result for a detection result of a pedestrian included only in the object detection result set outputted by Model B; and frames each including a figure as substitution data, for Model A and Model C.

Figure 7D:
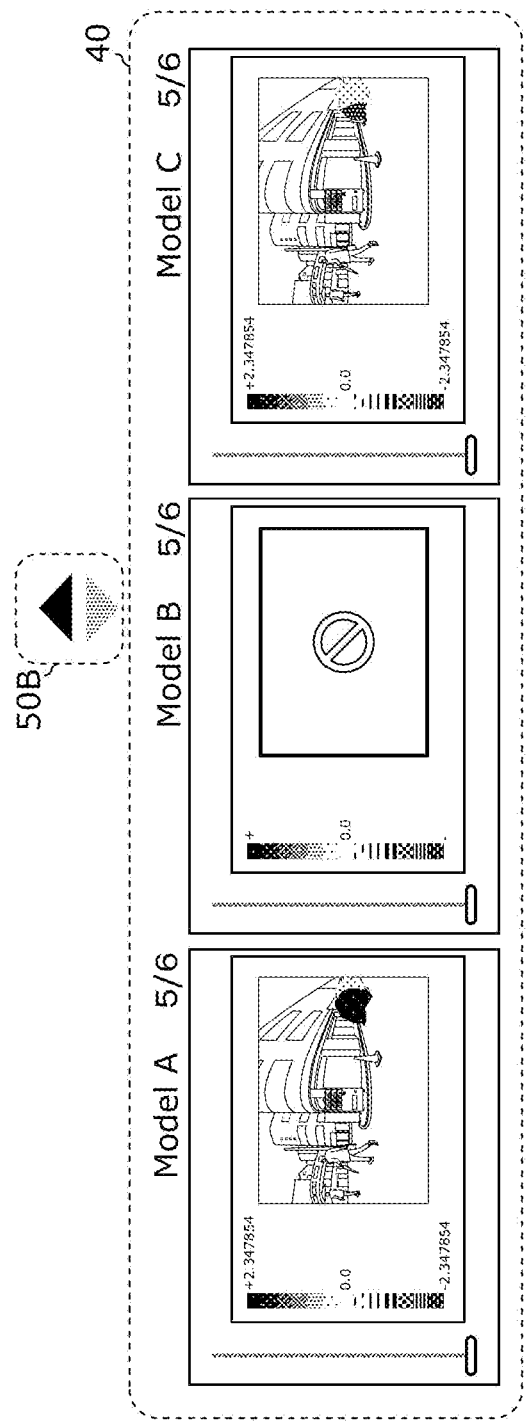
FIG. 7D illustrates a display example on a UI screen to which the information processing method according to the embodiment is applied.

FIG. 7D illustrates the state of result display 40 after the downward triangle included in analysis frame collective switcher 50B is pressed further once in the state illustrated in FIG. 7C. In this state, presented side by side are: two display images each including an analysis result for a detection result of a car commonly included in the object detection result set by Model A and the object detection result set by Model C; and a frame including a figure as substitution data, for Model B.

In this way, in the information processing method according to the present embodiment, the combinations of the prediction results by the models are determined based on the overlap of or the positional relationship between the detection frames corresponding to the object detection results included in the object detection result sets, in the above-mentioned example. The influences that the input image had on the object detection results included in the same combination among the combinations thus determined, in the object detection process by each model are presented side by side to the user. According to this feature, without troubles of finding detection results for the same detected subject and rearranging the found detection results, the user can look at and analyze the detection results for the same detected subject at one time.

Figure 8:
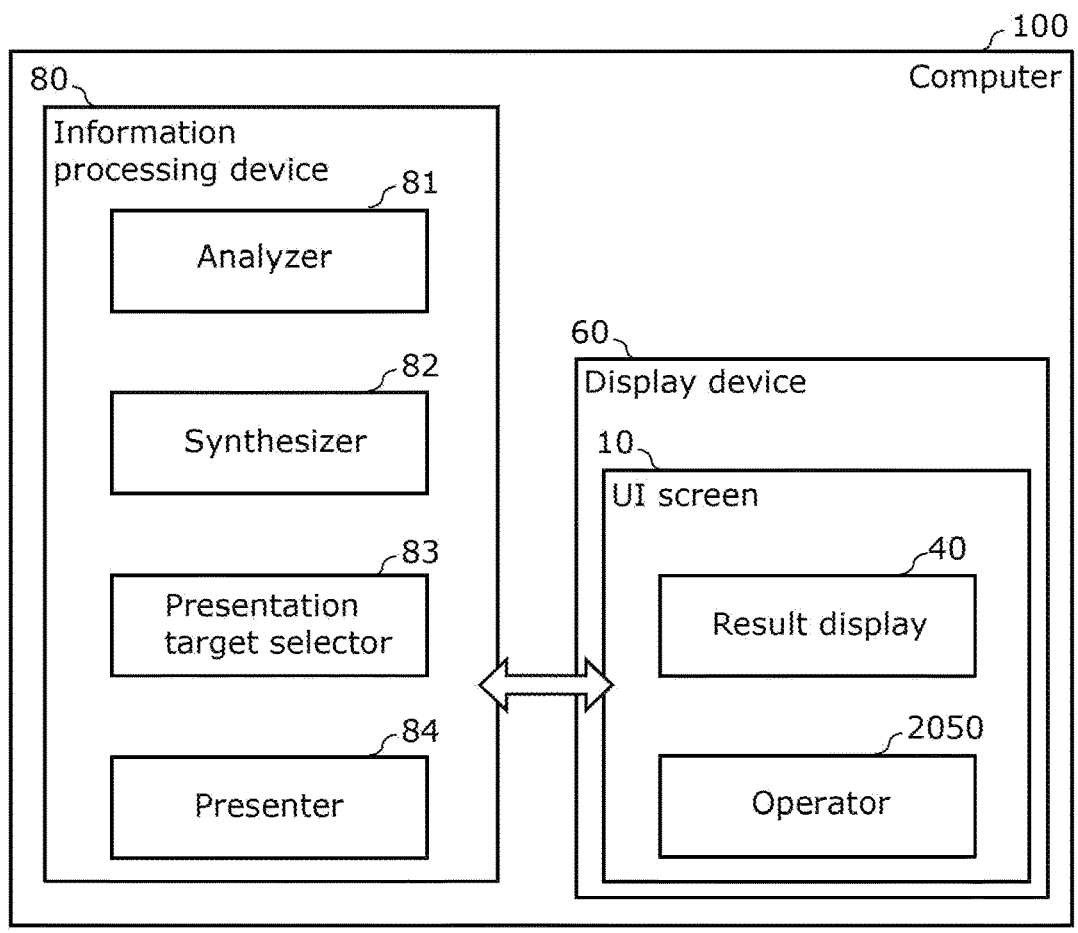
FIG. 8 is a block diagram illustrating a configuration example of a computer that performs the information processing method according to the embodiment.

Next, description is given of a configuration of a computer that executes such rearrangement and the information processing method according to the present embodiment that is performed for this rearrangement by the computer. FIG. 8 is a block diagram illustrating a configuration example of computer 100 that performs the information processing method according to the present embodiment.

Computer 100 is the above-mentioned computer of various types, and includes information processing device 80 and display device 60.

Information processing device 80 is configured by: a storage in which the above-mentioned application software is stored; and an arithmetic processor that reads out and executes this application software. Information processing device 80 includes analyzer 81, synthesizer 82, presentation target selector 83, and presenter 84, as functional constituent elements provided by executing the application software.

Analyzer 81 calculates the existence or non-existence (if any, the size and the direction) of an influence that each portion of the image (hereinafter, referred to as the input image) as the object detection process target had on each of the object detection results (that is, each of the detection frames) included in the object detection result sets outputted by the object detection models. Such an influence is calculated using various methods. The influence can be calculated using, for example, a method disclosed in the following literature. Analyzer 81 is an example of the prediction result obtainer and the input data influence obtainer, in the present embodiment. Reference: Denis Gudovskiy, Alec Hodgkinson, Takuya Yamaguchi, Yasunori Ishii, and Sotaro Tsukizawa; "Explain to Fix: A Framework to Interpret and Correct DNN Object Detector Predictions"; arXiv: 1811.08011v1; Nov. 19, 2018.

Figure 9A:
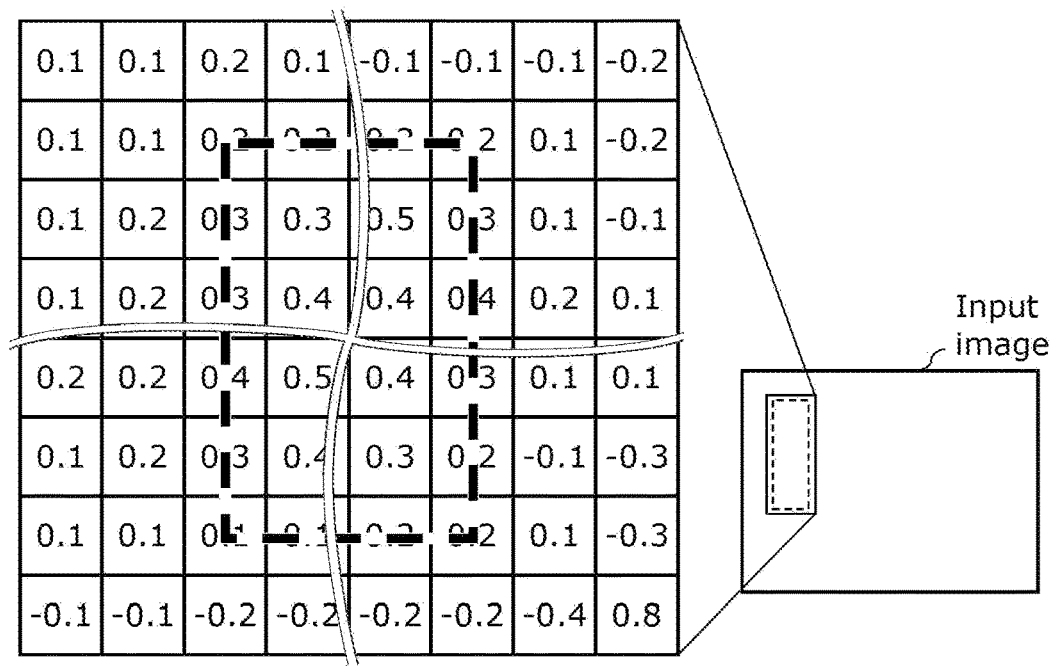
FIG. 9A is a schematic diagram for describing an analysis frame obtained in the above-mentioned information processing method.

FIG. 9A is a schematic diagram for describing the calculation of the influence by analyzer 81. In FIG. 9A, a broken line frame in the input image represents a detection frame corresponding to an object detection result. An illustration to the left of the input image is an extraction of a region including the detection frame, and squares therein are pixels (part of which is omitted) constituting the input image. A numerical value in each square is a value (hereinafter, also referred to as an analysis value) representing an influence that a value of each pixel had on the object detection result, which is calculated by analyzer 81. Note that, for convenience of description, although the analysis value is put in each pixel in FIG. 9A, such data is not actually added to the value of each pixel. Moreover, although description is given above assuming that the analysis value is calculated for each pixel, the present disclosure is not limited thereto. Pixels may be grouped into a super pixel, and then the analysis value may be calculated for each super pixel.

The range of pixels for which the analysis value is calculated differs depending on the design value of the object detection model and the size of the detection frame. In the example illustrated in FIG. 9A, the analysis value is calculated for a range that is wider by two pixels in the top-bottom direction and four pixels in the left-right direction than the pixels overlapping with the detection frame. The above-mentioned analysis frame corresponds to the outline of: a set of all the pixels for which the influence is calculated; or a set of the pixels for which the size of the calculated influence falls within a specific range.

Figures 9B, 10:
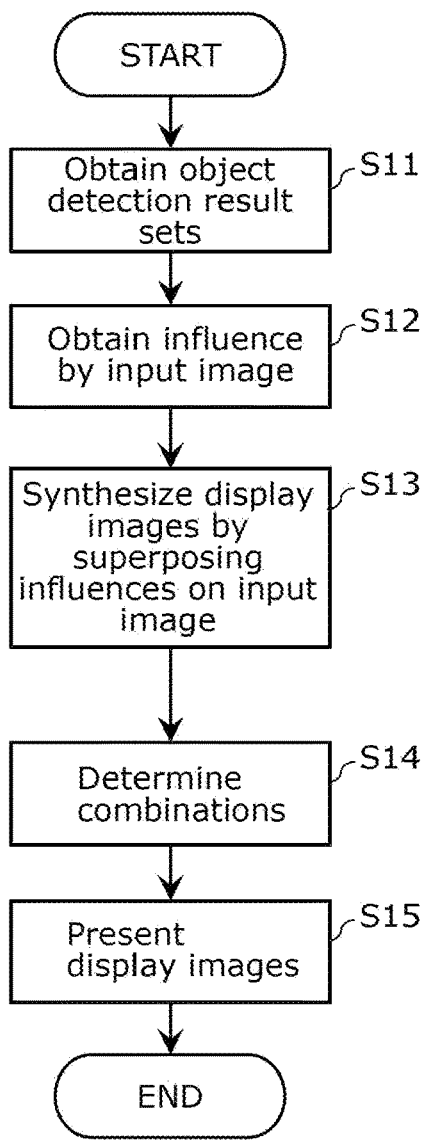
FIG. 9B illustrates an example of the data of the object detection result set in which data concerning the above-mentioned analysis frame is added.
FIG. 10 is a flow chart illustrating procedures of the information processing method according to the present embodiment.

FIG. 9B is a diagram illustrating an example of the data of the object detection result set in which the analysis values calculated by analyzer 81 are added to the object detection results. In this example, data of the analysis values calculated by analyzer 81 as illustrated in FIG. 9A is inserted in the data of the object detection result set that is outputted by Model A and is also illustrated in FIG. 3B. What is in the second row in FIG. 9B is data indicating the position and the size of a detection frame as well as the class of a detected subject on which this detection frame is put. What is in the third row in FIG. 9B is the data (the middle of which is omitted) of the analysis values calculated for this detection frame by analyzer 81. What follows in the fourth and subsequent rows is the position and the size of another detection frame included in the data of this object detection result set and the class of a detected subject as well as the data of the analysis values calculated for this detection frame.

Based on the analysis values calculated by analyzer 81, synthesizer 82 synthesizes an image (that is, a display image) by superposing an analysis frame on the input image, and outputs the display image. In the present disclosure, this analysis frame is represented by such a patterned region as illustrated in each of FIG. 1 and FIG. 7A to FIG. 7D. In the case where detection frames exist on one input image, one display image is synthesized for each detection frame. Each display image thus synthesized shows one input image together with the influence that the input image had on the object detection results executed on this input image, the influence corresponding to the analysis result calculated by analyzer 81.

In response to an input from operator 2050 included in UI screen 10 displayed on display device 60 such as a monitor, presentation target selector 83 selects display images to be displayed in result display 40 via presenter 84. Operator 2050 is a component on UI screen 10 that receives an operation of selecting, by the user, a group of the object detection results for which the analysis results are to be included in the display images to be displayed in result display 40. This group is defined by the attributes of the object detection results, for example, the class of the detected subject and the result type. Operator 2050 in the present embodiment includes input data selector 20A, model selector 20B, display result selector 20C, display data switcher 50A, analysis frame collective switcher 50B, and analysis frame individual switcher 50C. The input from operator 2050 includes: information on the input images and the models selected by the user; and information on the group of the object detection results, that is, information on the class of the detected subject or the result type. In accordance with these pieces of information, presentation target selector 83 selects images to be displayed in result display 40, from the display images outputted by synthesizer 82. Moreover, presentation target selector 83 rearranges the selected display images in each object detection result set and determines combinations thereof. Further, presentation target selector 83 inserts substitution information in an object detection result set including no detection result for a detected subject common to other models, depending on settings or specifications. Presentation target selector 83 is an example of the determiner, in the present embodiment.

Presenter 84 outputs, to display device 60, the display images included in the same combination among the combinations determined by presentation target selector 83 such that these display images are displayed side by side in result display 40. Otherwise, presenter 84 outputs the substitution data such that the substitution data is displayed in result display 40 side by side with the display images, depending on settings or specifications. Presenter 84 and result display 40 of display device 60 are an example of the influence presenter, in the present embodiment. Moreover, display device 60 is an example of the presentation device, in the present embodiment.

Procedures of the information processing method according to the present embodiment performed by computer 100 having such a configuration as described above are illustrated in a flow chart of FIG. 10. Note that description is given below assuming that processing by the above-mentioned functional constituent elements is processing by computer 100.

Computer 100 obtains object detection result sets that are respectively outputted by executing object detection on a common input image by different object detection models (Step S11). Each of the object detection result sets includes output values concerning individual detection frames corresponding to object detection results (see FIG. 3B). Note that what actually obtains data of the input image and executes the object detection on the data by the object detection models may be computer 100 itself and may be a device other than computer 100. For example, an information processing terminal such as a smartphone or an information processing device included in a device such as a camera may execute the object detection on an image taken by an imaging element included in each device.

Next, for each of the detection frames corresponding to the object detection results included in each object detection result set, computer 100 calculates an influence that each portion of the input image had on the calculation of the output value concerning the detection frame (Step S12). The calculation of the influence specifically means calculating an analysis value indicating any or both of the size (including the existence or non-existence) and the direction of this influence.

Next, computer 100 synthesizes display images by superposing the influences calculated in Step S12 on the input image (Step S13). Specifically, based on the calculated analysis values, the display images are synthesized by superposing analysis frames on the input image.

Next, computer 100 determines combinations of the detection results (detection frames) included in the object detection result sets respectively outputted by the different object detection models (Step S14). The detection results that are determined here to be included in the same combination are those that are determined to be detection results for a common detected subject or detection results whose possibility of being detection results for a common detected subject is higher than a predetermined reference, based on overlap of or a positional relationship between the detection frames. Moreover, the course of determining the combinations may include inserting substitution information in the object detection result sets, depending on settings or specifications.

Lastly, computer 100 performs presentation of the display images selected in accordance with settings of a group of the object detection results that is defined by the attributes such as the class and the result type (Step S15). This selection is performed in units of the combinations determined in Step S14, and hence the display images including analysis results for the detection results of the common detected subject (or the detected subject whose possibility of being common is high) are presented side by side.

Note that the above-mentioned procedures are given as an example, and the procedures of the information processing method of the present embodiment are not limited thereto. For example, the synthesizing of the display images (S13) or the obtaining of the influence (S12) and the synthesizing of the display images (S13) may be executed after the determining the combinations (S14) and before the display images are actually presented. In this case, the input image to be included in the display images to be displayed in result display 40 is first selected based on the object detection results. Then, the obtaining of the influence and the synthesizing of the display images may be performed while targeting at only the object detection results for the selected input image. Moreover, a user's operation concerning group settings on UI screen 10 may be received at arbitrary timing before Step S15, and display targets selected in accordance with the settings may become processing targets of unexecuted procedures. Then, in the case where the user's operation concerning the group settings is received again in or after Step S15, the display content in result display 40 is switched to the display images based on the object detection results selected in accordance with the latest group settings. Moreover, without execution of the determining of the combinations (Step S14), the display images may be displayed once. After that, for example, when a request operation of rearrangement from the user is received, Step S14 may be executed, and the display content in result display 40 may be updated in accordance with the result thereof. Moreover, the display content in which the result of Step S14 is reflected and the display content in which it is not reflected may be reversibly switchable.

Moreover, although the expression of the combinations of the object detection results (detection frames) is used in the above description, what this expression means in the present disclosure also includes combinations of the input images or the display images determined based on the overlap of or the positional relationship between the detection frames.

[Variations and Other Supplementary Notes]

The information processing methods according to one or more aspects of the present disclosure are not limited to the description of the above embodiment. Various modifications to the above embodiment that are conceivable to those skilled in the art may be included within one or more aspects of the present disclosure, so long as they do not depart from the essence of the present disclosure. The following gives examples of such modifications and other supplementary notes on the description of the embodiment.

(1) In the above-mentioned embodiment, the calculation of the influence is executed by computer 100, but is not limited thereto. The calculation of the influence may be executed by a device that is other than computer 100 and includes an information processing device, and computer 100 may directly or indirectly receive and obtain an input of the influence outputted by this device.

Moreover, in the above-mentioned embodiment, only a region or a frame (analysis frame) along the outline thereof is given as an example of an expression aspect of the influence, but the expression aspect thereof is not limited thereto. For example, the influence may be expressed by a figure such as a point or a cross placed in the center, the geometric center, or the like of the region.

(2) In the description of the above-mentioned embodiment and the drawings referred to in the description thereof, the display images in which the object detection results included in the same combination and the influences respectively obtained for these object detection results are superposed on each other are presented side by side in one row in result display 40, but how to present the display images is not limited thereto. For example, the display images may be presented one above the other in one column, and may be presented while being arranged in a matrix formed from rows and columns, such as a cross-in-square shape. Moreover, for example, the detection frames corresponding to the object detection results by each of the models or the analysis frames obtained for the detection frames may be collectively superposed on one input image. The analysis frames in this case are not such patterned regions as illustrated in FIG. 7A to FIG. 7D, and may be each represented by only an outline or may be each represented by a region that is colored with a higher degree of transparency.

(3) In the description of the above-mentioned embodiment and the drawings referred to in the description thereof, given is the example where the display images in which the influences obtained for the object detection results included in the determined same combination are superposed on the input image are presented side by side, but what is presented in result display 40 is not limited to such display images. For example, the input image on which the detection frames corresponding to the object detection results are superposed instead of or in addition to the influences may be presented in result display 40. Moreover, the information to be superposed on the input image may be switchable in response to the user's operation.

(4) In the description of the above-mentioned embodiment and the drawings referred to in the description thereof, for convenience of description, what is displayed at a time in result display 40 on UI screen 10 is only the object detection results included in one combination and the influences obtained for these object detection results, but is not limited thereto. If the display images based on the object detection results included in the same combination are gathered, arranged, and further surrounded by a frame and thus can be easily understood by the user, the display images corresponding to combinations may be presented at a time in result display 40.

(5) In the description of the above-mentioned embodiment, the combinations are determined by rearranging and placing, in the same order, the contents of the data of the object detection result sets, but how to achieve the combinations is not limited thereto. For example, instead of rearranging the contents of the data of the object detection result sets, an identifier indicating the combination to which each object detection result belongs may be added, or a table in which information on the combinations is held may be generated or updated separately from the object detection result sets. Alternatively, calculation may be performed each time in response to the user's operation, and the combinations for determining the display images to be presented in result display 40 may be determined.

(6) The sorting depending on the classes of the detected subjects, which is described with reference to FIG. 3A and FIG. 4A, may be executed not only to compare the prediction results among the models but also to organize the prediction results by one model.

On the other hand, even if the prediction results by the models or the analysis results thereof are display targets, the sorting depending on the classes is not essential. That is, without the sorting depending on the classes, the determining of the combinations based on the overlap of or the positional relationship between the detection frames may be performed.

(7) In the description of the above-mentioned embodiment using the examples illustrated in FIG. 3A to FIG. 6, the determining of the combinations of the object detection results is performed based on the overlap of or the positional relationship between the detection frames, but the method of determining the combinations is not limited thereto. For example, in the case where the influences, that is, the analysis frames have already been calculated, the combinations may be determined based on the degree of similarity among the influences. The degree of similarity among the influences here can be determined, for example, by comparing the magnitudes of vectors or based on the degree of similarity (for example, a cosine distance) between these vectors, the vectors each having, as elements, the (horizontal and vertical) size of a pixel region for which analyzer 81 calculates the analysis value for each of the object detection results respectively outputted by two object detection models.

(8) Moreover, in addition to the overlap or the positions of the detection frames, the combinations of the object detection results may be determined further based on the degree of similarity between likelihoods of the detection results. For example, higher scores may be given to combinations with larger overlap of the detection frames and combinations with a higher degree of similarity between the likelihoods of the detection results, and the combinations may be determined based on the result of such scoring.

(9) A portion or all of the functional constituent elements included in the above-described information processing systems may be configured from one system large-scale integration (LSI) circuit. A system LSI circuit is a super-multifunction LSI circuit manufactured with a plurality of components integrated on a single chip, and is specifically a computer system including a microprocessor, read-only memory (ROM), and random access memory (RAM), for example. A computer program is stored in the ROM. The system LSI circuit achieves its function as a result of the microprocessor operating according to the computer program.

Note that although a system LSI circuit is described here, it may also be referred to as an integrated circuit (IC), an LSI circuit, a super LSI circuit, or an ultra LSI circuit, depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used.

Further, when development of a semiconductor technology or another derivative technology provides a circuit integration technology which replaces LSI, functional blocks may be integrated by using this technology. Application of biotechnology, for example, is a possibility.

(10) An aspect of the present disclosure is not limited to the information processing method described with reference to the flow chart illustrated in FIG. 10, and may be an information processing system that includes computer 100 and a program executed by computer 100. In addition, an aspect of the present disclosure may be a non-transitory computer-readable recording medium having the computer program recorded thereon.

INDUSTRIAL APPLICABILITY

An information processing method and the like according to the present disclosure can be utilized for a user interface used to compare results of a prediction process by a computer.

The invention claimed is:
1. An information processing method performed by a computer, the information processing method comprising:
obtaining prediction results that are results of prediction performed by predictors on same input data;
obtaining, for each of the prediction results, an influence that the input data had on the prediction result, wherein the influence is a response made by a corresponding predictor among the predictors on the input data in a prediction process performed for outputting the prediction result;
determining, based on the prediction results, one or more combinations of the prediction results; and
presenting, side by side or by superposition, using a presentation device, influences obtained for prediction results that are included in the prediction results and are in a same combination among the one or more combinations, wherein
each of the predictors is an object detector,
each of the prediction results is an object detection result set that includes object detection results,
the influence obtained for each of the prediction results is an influence that the input data had on each of the object detection results included in the object detection result set,
each of the one or more combinations includes object detection results included in different object detection result sets among the object detection result sets, and
the influences presented side by side or by superposition are influences obtained for the object detection results included in the same combination.

2. The information processing method according to claim 1, wherein
each of the object detection results includes a class that is based on an object detected, and
in each combination among the one or more combinations, the class included in each of the object detection results included in the combination is a class that is common to other object detection results included in the combination.

3. The information processing method according to claim 1, wherein
each of the object detection results includes a detection frame, and
the one or more combinations are determined based on overlap of or a positional relationship between detection frames included in the object detection results included in different object detection result sets.

4. The information processing method according to claim 3, wherein
each of the object detection results includes a detection likelihood, and
the one or more combinations are determined further based on a degree of similarity between detection likelihoods included in the object detection results included in different object detection result sets.

5. The information processing method according to claim 1, wherein
the presenting of the influences includes presenting, side by side, substitution data and the influences obtained for the object detection results included in the same combination, when the same combination does not include the object detection results included in an object detection result set of an object detector among the object detectors.

6. The information processing method according to claim 1, further comprising:
presenting, side by side, substitution data and an influence obtained for an isolated object detection result when the object detection results include the isolated object detection result, the isolated object detection result being an object detection result not included in any of the one or more combinations.

7. The information processing method according to claim 1, wherein
the presenting of the influences includes presenting: an influence obtained for a reference object detection result that is one of the object detection results included in a reference object detection result set that is one of the object detection result sets; and influences obtained for the object detection results included in a combination among the one or more combinations that includes the reference object detection result.

8. The information processing method according to claim 7, further comprising:
receiving an operation of selecting the reference object detection result set; and
switching the reference object detection result set to the object detection result set selected by the operation.

9. The information processing method according to claim 1, further comprising:
receiving an operation of selecting the input data; and
switching the input data to the input data selected by the operation, wherein
the presenting of the influences includes presenting influences obtained for the prediction results of prediction performed by the predictors on the input data selected.

10. The information processing method according to claim 1, further comprising:
receiving an operation of selecting a group of the object detection results; and
switching the object detection results corresponding to the influences presented or the object detection results presented, to object detection results of the group selected by the operation.

11. The information processing method according to claim 1, wherein
the presenting of the influences further includes presenting, for each of the influences presented, information indicating a predictor among the predictors that has output the prediction result corresponding to the influence.

12. An information processing system comprising:
a processor; and
memory having a program stored therein, wherein
the program, when executed by the processor, causes the processor to:
obtain prediction results that are results of prediction performed by predictors on same input data;
obtain, for each of the prediction results, an influence that the input data had on the prediction result, wherein the influence is a response made by a corresponding predictor among the predictors on the input data in a prediction process performed for outputting the prediction result;
determine, based on the prediction results, one or more combinations of the prediction results; and
present, side by side or by superposition, using a presentation device, influences obtained for prediction results that are included in the prediction results and are in a same combination among the one or more combinations, wherein
each of the predictors is an object detector,
each of the prediction results is an object detection result set that includes object detection results,
the influence obtained for each of the prediction results is an influence that the input data had on each of the object detection results included in the object detection result set,
each of the one or more combinations includes object detection results included in different object detection result sets among the object detection result sets, and
the influences presented side by side or by superposition are influences obtained for the object detection results included in the same combination.

13. A non-transitory computer-readable recording medium for use in a computer which includes a processor, the recording medium having a program recorded thereon for causing the processor to:
obtain prediction results that are results of prediction performed by predictors on same input data;
obtain, for each of the prediction results, an influence that the input data had on the prediction result, wherein the influence is a response made by a corresponding predictor among the predictors on the input data in a prediction process performed for outputting the prediction result;
determine, based on the prediction results, one or more combinations of the prediction results; and
present, side by side or by superposition, using a presentation device, influences obtained for prediction results that are included in the prediction results and are in a same combination among the one or more combinations, wherein
each of the predictors is an object detector,
each of the prediction results is an object detection result set that includes object detection results,
the influence obtained for each of the prediction results is an influence that the input data had on each of the object detection results included in the object detection result set,
each of the one or more combinations includes object detection results included in different object detection result sets among the object detection result sets, and
the influences presented side by side or by superposition are influences obtained for the object detection results included in the same combination.

* * * * *